(12) United States Patent
Ruff

(10) Patent No.: US 9,214,716 B2
(45) Date of Patent: Dec. 15, 2015

(54) RADIO SWITCH

(75) Inventor: Eduard Ruff, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 415 days.

(21) Appl. No.: 13/636,306

(22) PCT Filed: Feb. 14, 2011

(86) PCT No.: PCT/EP2011/052091
§ 371 (c)(1),
(2), (4) Date: Dec. 5, 2012

(87) PCT Pub. No.: WO2011/117021
PCT Pub. Date: Sep. 29, 2011

(65) Prior Publication Data
US 2013/0082886 A1 Apr. 4, 2013

(30) Foreign Application Priority Data
Mar. 23, 2010 (DE) .......................... 10 2010 003 152

(51) Int. Cl.
H01Q 1/00 (2006.01)
H01Q 1/22 (2006.01)
H01Q 9/42 (2006.01)
H02K 7/18 (2006.01)
H02K 35/02 (2006.01)
H02N 2/18 (2006.01)

(52) U.S. Cl.
CPC . *H01Q 1/22* (2013.01); *H01Q 9/42* (2013.01); *H02K 7/1869* (2013.01); *H02K 35/02* (2013.01); *H02N 2/18* (2013.01)

(58) Field of Classification Search
CPC ........ H02K 7/1869; H02K 35/02; H02N 2/18
USPC ........................... 343/720, 702, 700 MS, 906
See application file for complete search history.

(56) References Cited

U.S. PATENT DOCUMENTS 6,239,765 B1 * 5/2001 Johnson et al. ............... 343/795
7,126,497 B2   10/2006 Face et al.
7,583,227 B2 *  9/2009 Kuraoka et al. ............... 343/702
7,830,330 B2 * 11/2010 Pelzer ........................... 343/876
(Continued)

FOREIGN PATENT DOCUMENTS

CN   1669180 A    9/2005
CN   101361252 A  2/2009
(Continued)

OTHER PUBLICATIONS

International Search Report and Written Opinion issued in international application No. PCT/EP2011/052091, mailed Aug. 19, 2011 (13 pages including translation of the ISR).
Office Action and Search Report issued in corresponding Chinese Appln. No. 201180015620.7 dated Jun. 16, 2014 (16 pgs).

*Primary Examiner* — Hoanganh Le
(74) *Attorney, Agent, or Firm* — Brinks Gilson & Lione

(57) ABSTRACT

A radio switch, in particular a snap-action switch, having an antenna, a transmitter assembly and a generator, wherein the antenna is electrically connected to the transmitter assembly in order to emit a signal which is generated by the transmitter assembly, wherein the transmitter assembly is accommodated on a circuit mount which is in the form of a panel, wherein the antenna is held in the radio switch on a mount substrate which is separate from the circuit mount.

17 Claims, 4 Drawing Sheets

(56) References Cited

U.S. PATENT DOCUMENTS

| | | |
|---|---|---|
| 7,903,033 B2 * | 3/2011 | Bellows .................. 343/702 |
| 8,228,244 B2 * | 7/2012 | Wong et al. ............... 343/702 |
| 2005/0275581 A1 | 12/2005 | Grassl et al. |
| 2006/0103578 A1 * | 5/2006 | Landaeus et al. .......... 343/702 |
| 2008/0315595 A1 | 12/2008 | Bataille et al. |

FOREIGN PATENT DOCUMENTS

| | | |
|---|---|---|
| WO | 2006/051113 A1 | 5/2006 |
| WO | WO 2009/046146 A1 | 4/2009 |

* cited by examiner

RADIO SWITCH

This application is a filing under 35 U.S.C. §371 of International Patent Application PCT/EP2011/052091, filed Feb. 14, 2011, which claims priority to German Application No. 1 0 201 0 003 152.6, filed Mar. 23, 2010, each of which is incorporated by reference herein in its entirety.

This invention concerns a radio switch as described in the preamble of claim 1.

The state of the art describes different radio switches, for example, in the form of monostable, bistable, or metastable radio switches, in particular energy-independent radio switches, which use a generator, for example an induction generator, to generate energy upon actuation in order to transmit a signal as a result of actuation of the radio switch. For suitable encoding, the electrical energy generated is directed to a transmitter assembly of the radio switch, which is located together with an antenna on a circuit board. The antenna is generally a printed antenna, a patch antenna, or an antenna connected flush with the circuit board. Such modules can be manufactured in a cost-effective and highly integrated manner, whereby advantageously a contact with the antenna can be simultaneously implemented with short leads. To form a radio switch which is based on an existing switch design, but that works with a different transmission frequency, it is sufficient merely to replace the module.

Based on this, the invention has the task of suggesting an alternative radio switch that is also small.

This task is solved by the invention in the features of claim 1.

The invention proposes a radio switch, particularly a snap-action switch, with an antenna, a transmitter assembly, and a generator, whereby the antenna is electrically connected to the transmitter assembly to emit a signal that can be generated by the transmitter assembly, whereby the transmitter assembly is placed on a board-shaped circuit carrier, whereby the antenna is held on a carrier substrate within the radio switch that is separate from the circuit carrier.

In one embodiment of the invented radio switch, the antenna is held in the same position on the carrier substrate, whereby the antenna and the carrier substrate have no independent connection with one another.

In another embodiment of the invented radio switch, the carrier substrate extends over a wide area, and is particularly implemented in the form of a board.

In still another embodiment of the invented radio switch, the carrier substrate forms a carrier for the antenna, in particular, a carrier adapted to the contour of the antenna.

The invention proposes a radio switch, whereby the antenna is arranged in the same position between the carrier substrate and a support element, particularly permanently, whereby the support element acts as a pressing element.

Furthermore, the invention proposes a radio switch, whereby the support element is supported against a housing element of the radio switch, particularly an upper part of the housing, and/or the carrier substrate is supported on another housing element of the radio switch, particularly a lower part of the housing.

According to one aspect of the invented radio switch, an opening is formed in the carrier subtract for contacting of the antenna on a side of the carrier substrate directed away from the antenna, whereby a contact element of the antenna extends through the opening.

According to another aspect of the invented radio switch, the antenna has a contact element for a sliding contact connection or a plug connection, whereby the contact element is particularly formed for connection with corresponding contact surfaces of the circuit carrier.

In one embodiment of the invented radio switch, the circuit carrier extends in a vertical plane and the carrier substrate in a horizontal plane, in particular, above the circuit carrier.

In another embodiment of the invented radio switch, the antenna is contacted on an upper end of the circuit carrier extending in a vertical plane, in particular by means of a form-fitting and/or force-fitting fastening procedure.

In still another embodiment of the invented radio switch, the carrier substrate extends in a horizontal plane above an upper end of the generator, overlapping it in the vertical direction, in particular in parallel with a horizontally oriented neighboring external side of the generator and/or a housing inner side of the radio switch.

The invention proposes a radio switch, whereby the circuit carrier together with the carrier substrate forms an L-shaped cross section.

According to one aspect of the invented radio switch, the circuit carrier extends from a lower end of the radio switch, in particular, of the generator, next to an outer side of the generator and/or a housing inner side of the radio switch, overlapping it in the lengthwise direction, in parallel with it in a vertical level upwards, in particular, up to the circuit carrier.

According to an embodiment of the invented radio switch, the generator has an actuation element that is adjacent to an induction coil and extends together with it in the lengthwise direction, whereby the actuation element overlaps the induction coil in the vertical direction, whereby the circuit carrier overlaps the actuation element in the vertical direction.

According to another embodiment of the invented radio switch, the generator is an induction snap generator.

According to one aspect of the invented radio switch, a control element extends through the circuit carrier to engage with the actuation element.

According to another aspect of the invented radio switch, the circuit carrier works together with a housing element of the radio switch to seal the housing.

Additional characteristics and advantages of the invention can be found in the following description of embodiments of the invention, based on the figures in the drawings that show the significant details of the invention, and from the claims. The individual characteristics can each be implemented individually or in arbitrary combinations in variants of the invention.

Preferred embodiments of the invention are described in more detail below based on the attached drawings. The figures show:

Figure 1:
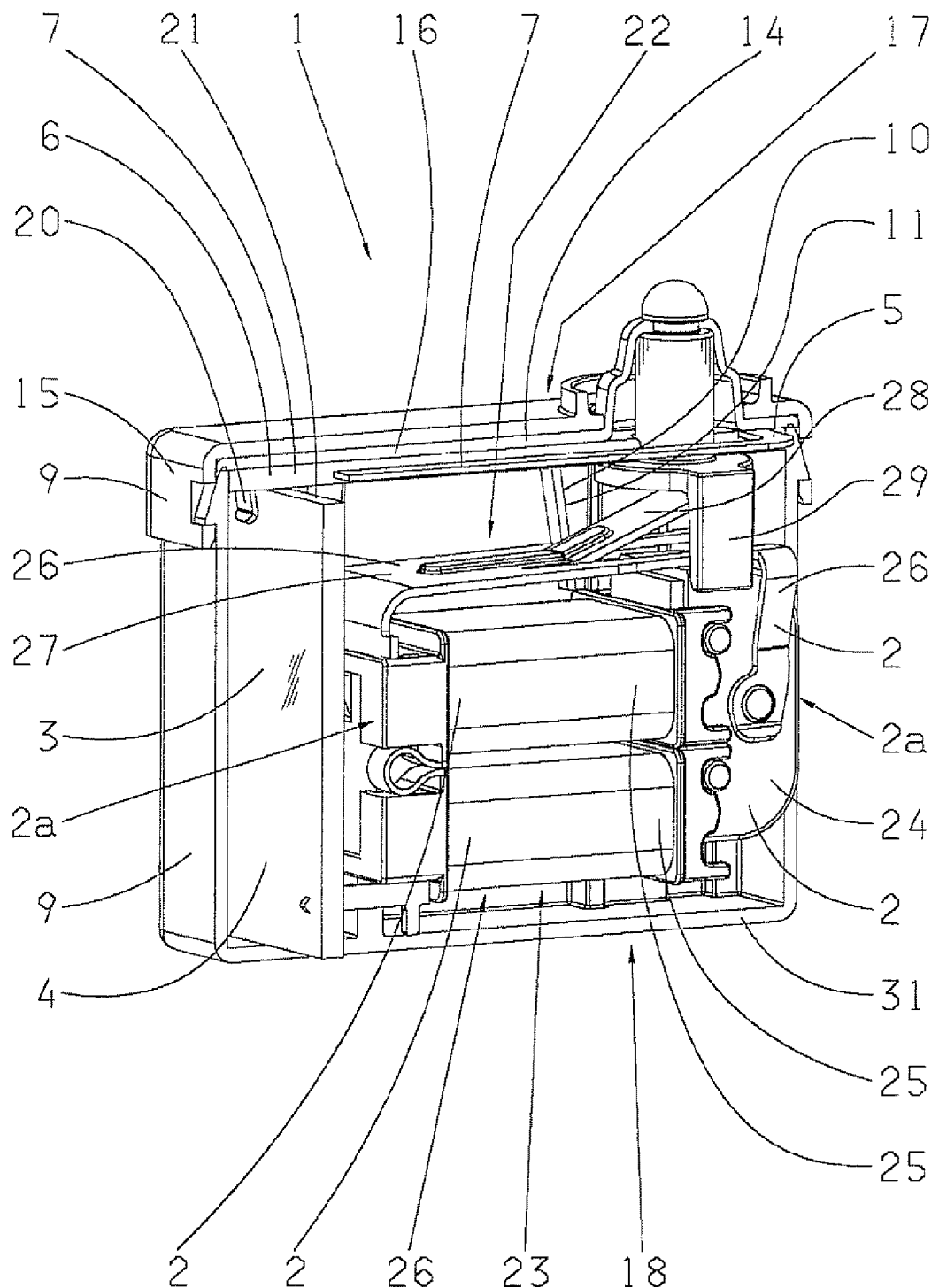
FIG. 1 shows a cross section of an example of a radio switch according to one embodiment of the invention.

FIG. 1 shows the cross section of an example of a radio switch 1 according to the invention, which is particularly implemented as an energy-independent radio switch 1. Such an energy-independent radio switch draws its energy from the actuation process, in which a generator 2 of radio switch 1 is placed into operation. The generator 2, for example an induction generator, a piezo generator, etc. then provides energy to a transmitter group 2, which for example can be buffered in a capacitor.

The invented radio switch 1 is for example a snap-action switch, in which a magnetic element is mechanically accelerated by a spring load during a movement of the magnetic element to reverse the polarity of the core of an induction coil of the generator. In general, a radio switch 1 according to the invention can be implemented as a monostable (one resting position), bistable (two resting positions), or metastable (stable against small changes, unstable against larger changes) radio switch 1.

Figure 2:
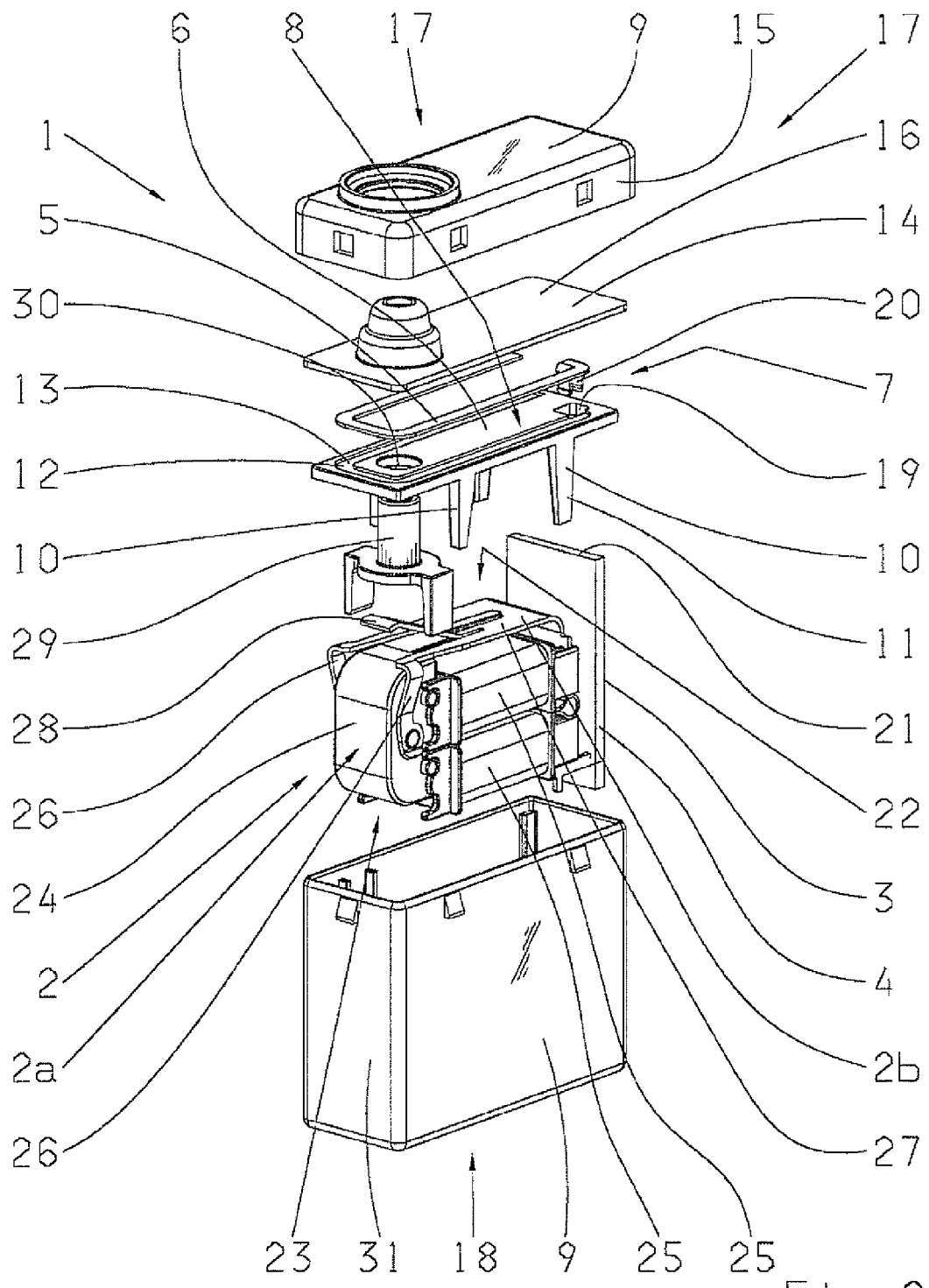
FIG. 2 shows an exploded view of an example of a radio switch according to FIG. 1.
Figure 3:
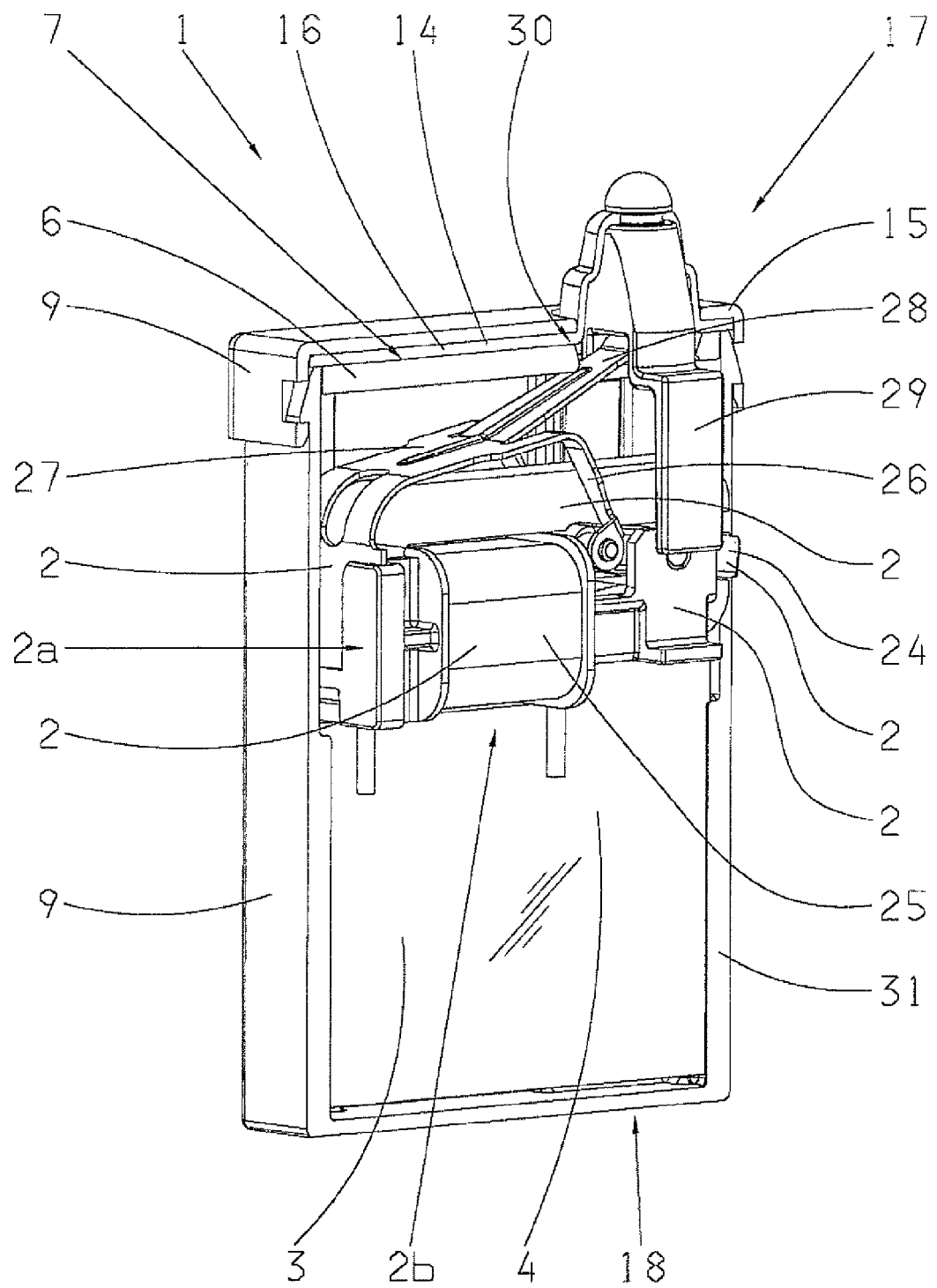
FIG. 3 shows a cross section of an example of a radio switch according to another embodiment of the invention.

The transmitter assembly 3 is provided to generate a signal, i.e. a switching signal, using the generated energy that is transmitted to a connected antenna 5 for emission as a radio signal. The transmitter assembly 3 has a board-shaped circuit carrier 4, for example in the form of a circuit board, which supports the electronics of the transmitter assembly 3 (FIGS. 1, 2, 3). Here, in contrast with the state of the art, antenna 5 is not supported on circuit carrier 4 of transmitter assembly 3, but rather is in accordance with the invention held on a carrier substrate 6, for example an antenna carrier, particularly a flat one, which is separate from the circuit carrier 4 of transmitter assembly 3. The circuit carrier 4 and the carrier substrate 6 are each separate substrates according to the invention.

An independently implemented antenna assembly 7 formed in such a way consisting of an antenna 5 and carrier substrate 6 permits the simple adaptation of existing radio switch designs to changing requirements of use.

The carrier substrate 6 has a support surface 8 for antenna 56, on which this is held in radio switch 1, for example supported there (FIG. 2). The carrier substrate 6 is supported in housing 9 according to the invention, for example, on a housing element and/or additional components of the radio switch 1. For support and/or positioning in housing 9, the carrier substrate 6 can for example have one or more carrier substrate support elements 10, for example in the form of legs 11 extending downwards. A carrier substrate 6 and/or antenna carrier designed according to the invention can for example be manufactured cost-effectively as a one-piece plastic component.

The carrier substrate 6 is according to the invention preferably an inelastic and/or rigid and/or stuff substrate, for example in the form of a board or thin plate (FIGS. 1, 2). The carrier substrate 6 is, with respect to its outer dimensions, adapted for example to the inner cross section of the housing 9 of radio switch 1 that supports the carrier substrate 6 and antenna 5. The carrier substrate 6 is preferably flat in form, that is, has a small installed height and relatively large lengthwise and lateral extensions, in order to be able to hold or support the antenna along its entire expanse, and has for example only a small height in order to avoid unnecessary material costs and ensure small dimensions.

The antenna 5 is held in the radio switch 1 on a carrier substrate 6, for example in such a way that the carrier substrate 6 and antenna 5 do not have or form any independent connection. Antenna 5 and carrier substrate 6 in this case are each independently formed and are for example forced against one another by the connection of the housing top and bottom parts into a housing 9. The carrier substrate 6 represents for example only a support for the antenna in the radio switch 1.

An antenna assembly 7 formed in this manner from carrier substrate 6 and antenna 5 makes it possible simply to replace antenna 5, carrier substrate 6, or the entire antenna assembly 7, for example to connect differently dimensioned antennas 5 to the transmitter assembly 3 and use different frequencies. Furthermore, the fact that a carrier substrate 6 that is separate from transmitter assembly 3 with respect to circuit carrier 4 in accordance with the invention as well as an antenna 5 not connected to the carrier substrate 6 are provided means that carrier substrate can be implemented in a cost-effective manner, for example as a plastic element instead of as a circuit board. However, it is also feasible for antenna 5 and the carrier substrate 6 to have an independent connection to one another, for example that they are permanently connected.

The antenna 5 is for example a U-shaped antenna and/or a loop antenna, or an antenna 5 of a different shape, for example a planar antenna, which, for example, is tuned to the transmission frequency provided by transmitter assembly 3. For example, it is possible for the antenna 5 to be implemented as a U-shaped punched and bent component, in particular as a component that can be adapted to the transmission frequency by being cut to a variable length (FIG. 2). The antenna 5 has for example at least an integrally formed contact element 20.

To keep antenna 5 accurately in the provided position relative to the carrier substrate 6, according to the invention the carrier substrate 6 can have for example a holder 12 for the antenna 5 (FIG. 2), in particular, for example, a holder 12 adapted to the contour of the antenna 5. The holder 12 can for example be provided in the form of a groove 13 in the carrier substrate 6, in the form of a material gap, etc. The holder 12 is particularly implemented in such a way that different antennas 5 can be held in the same way. The holder 12 in particular permits the lateral support of antenna 5. The antenna 5 is for example arranged on the carrier substrate 6 by insertion into such a holder 12.

It is also feasible, for example, that one or more positioning elements extend away from the substrate towards antenna 5, which engage in the contour of the antenna 5 in order to keep it in position, i.e. prevent it from slipping to the side.

In the radio switch 1 according to the invention, the antenna 5 is held in position on carrier substrate 6, for example loosely inserted into holder 12, in particular between the carrier substrate 6 and a support element 14 or flat support located above antenna 5, in particular permanently, whereby the support element 14 acts e.g. as a pressing element (FIG. 1). Thus the antenna 5 is caught in the radio switch 1 in a sandwich arrangement between carrier substrate 6 and support element 14, in particular for example clamped. The support element 14 is for example supported against a housing element of the radio switch 1, in particular for example a housing upper part 15. For example, a housing element can be implemented as a pressing element. Other support elements 14 are feasible.

The invention provides, for example, the use of a sealing element 16 (FIG. 2) as a support or pressing element 14, i.e. an elastic or semielastic pressing element that supports the sealing of housing 9. Thereby for example the sealing element 16 can be clamped between the carrier substrate 6 and a housing element, whereby the carrier substrate 6 works together with a housing element of the radio switch 1 to seal the housing 9.

According to the invention, the carrier substrate 6 is located on an upper end 17 of the radio switch 1 (FIG. 1, 3), for example over the generator 2 and/or the transmitter assembly 3, so that it is quickly accessible upon opening of the radio switch 1 by removal of the housing upper part 15. Furthermore, the carrier substrate 6 can be arranged in such a way, for example contacted without force on a circuit carrier 4 located beneath it, that it is for example pluggable by pushing. A radio switch 1 with a predefined working frequency is thus easy to assemble and/or reconfigure in accordance with a change in working frequency.

According to the invention, the carrier substrate 6 thereby extends in particular in a horizontal plane (FIG. 1, 3) in the radio switch 1, in particular above the circuit carrier 4, and furthermore in particular overlapping the circuit carrier in the vertical direction, while the circuit carrier 4 extends in a vertical plane. By means of such an arrangement of the separate carrier substrate 6 and the circuit carrier 4, moreover, the installation space can be kept small. According to the invention, the circuit carrier 4 forms for example an L-shaped cross-section with the carrier substrate 6, enabling a simple contacting of the antenna 5 with short line lengths. Other arrangements of the circuit carrier 4 can also be possible.

The circuit carrier 4 extends for example upwards from a lower end 18 of the radio switch 1, in particular of the generator 2, along an outer side 2a of the generator 2 and/or a housing inner side of the radio switch in a vertical plane in parallel and/or plane parallel to them, in particular up to the carrier substrate 6, whereby the circuit carrier 4 in particular overlaps the generator 2 in the lengthwise direction.

The carrier substrate 6 has, for the electrical contacting of antenna 5 to the transmitter assembly 3, at least one opening 19 and or penetration opening, whereby the contacting is provided for example on the side of the carrier substrate 6 away from the antenna 5 (FIG. 2). The antenna 5 held on carrier substrate 6 furthermore forms, for example at a position corresponding to opening 19, a contact element 20 for the electrical contacting of the transmitter assembly 3. The opening 19 lies in radio switch 1 opposite, for example, a contact surface on circuit carrier 4 provided for contacting, which for example is formed on an upper end 21 of a vertically arranged circuit carrier 4 (FIG. 1).

One or more contact elements 20 can for example be provided for a sliding contact connection or for example a plug connection with the circuit carrier 4 that project through the opening 19 in the carrier substrate 6 (FIG. 1). The contact elements 20 are each provided, for example, for connection to corresponding contact surfaces on the transmitter assembly 3 on a circuit carrier 4 located below them, for example a vertically oriented circuit carrier 4 (FIGS. 1, 3). In such an arrangement, advantageously short contact elements 20 can be used, in particular in an arrangement in which the circuit carrier 4 extends to the carrier substrate 6 (FIG. 1). For the contacting, for example, a form-fitting and/or force-fitting fastening process can be provided that permits simple fastening and/or release, for example without the use of tools. The contact elements 20 can also extend, for example, in the lengthwise or transverse direction or upwards from antenna 5, whereby for example an opening can be omitted and the circuit carrier 4 for example can be located elsewhere.

In an embodiment of the invented radio switch 1 in accordance with for example FIG. 1, the carrier substrate 6 extends in a horizontal plane over an upper end 22 of the generator 2, in particular for example at a distance that permits a compatible arrangement, whereby between the generator 2 and the carrier substrate 6, for example, shielding can be provided. The carrier substrate 6 overlaps for example the generator 2 in the vertical direction, in particular primarily parallel to it and/or parallel to a horizontally oriented adjacent outer side 2b of the generator. Furthermore the carrier substrate 6 is for example oriented parallel with a housing inner side of the radio switch 1, so that using the separately and/or standalone implemented carrier substrate 6, a compactly built arrangement can be obtained, in particular if the circuit carrier 4 as shown in FIG. 1 overlaps the generator 2 in the lengthwise direction and extends vertically from a lower end 23 of the generator upwards.

In an arrangement shown in FIG. 3, the board-shaped circuit carrier 4 extends in a vertical plane from a lower end 23 of the generator 2 downwards, whereby it is overlapped in the vertical direction by generator 2. With such an arrangement, for example, a radio switch 1 can be implemented in which the transmitter assembly 3, which is for example implemented as a one-piece module, is located for example under the generator 2, in such a way that a long radio switch 1 can be implemented with narrow lengthwise and transverse dimensions.

The minimum installation space required for formation of the radio switch 1 is for example determined by the minimum dimensions of the carrier substrate 6 and transmitter assembly 3 and/or circuit carrier 4. Due to the shorter length dimensions in one dimension of space obtained in comparison with a circuit carrier with an integrated antenna, installation forms for a radio switch 1 according to the invention can be implemented which can be built small and compact and thus permit the miniaturization of the radio switch 1.

The invention provides for the use of a generator 2 in the radio switch 1 which can also be small and still provide high energy upon actuation of the radio switch 1. According to the invention, such a generator 2 can in particular be a miniaturized generator 2 in the form of an induction snap generator (FIGS. 1, 2, 3) in which a magnetic element 24 is moved relative to an induction coil 25. In addition, further compact generators 2 are possible that for example make use of other mechanisms for energy generation, e.g. piezo generators.

In a snap generator 2, a high acceleration of the magnetic element 24 between two resting points, in each of which the magnetic element 24 is supported on one flank of a core of the induction coil 25, for example on the face, is generated by a snap movement, thereby effecting a high temporal change in the magnetic flux, whereby the polarity of the core is reversed during a switch in the rest position.

To generate a snap movement, a spring element 26 connected to the magnetic element 24 corresponding to the magnetic element 24 is increasingly stressed during its movement between the resting positions, until the magnetic element 24 has reached a middle point between the resting positions. Upon reaching the middle point, energy stored by the stress on the spring element 26 can be used for the mechanical acceleration of the magnetic element 24 towards the resting position to be assumed by means of release of the spring element 26, resulting in an extremely accelerated approach of the magnetic element 24 towards the core. Between the resting positions, the magnetic element 24 is thus moved away from contact with the flanks and moved along a suitable path, e.g. a circular arc or Λ-shaped path which permits an increasing and decreasing spring stress.

Such a generator 2 has an actuation element 27. The actuation element 27 can be provided to store actuation energy during a movement of the magnetic element 24 from a starting resting position to another resting position. Using the stored energy, a return force can be exerted on magnetic element 24 in order to return it to the starting resting position after actuation. The actuation element 27 is for example formed integrally with the spring element 26, e.g. as a clip shape, and also implemented as a spring element.

In an advantageously compact arrangement, the actuation element 27 is located below the carrier substrate 6, for example above an induction coil 25 (FIG. 3) of generator 2, whereby it extends together with the coil in the lengthwise direction, whereby the induction coil 25 in particular is overlapped by the carrier substrate 6 in the vertical direction, just as does the actuation element 27 (a sandwich arrangement). FIG. 1, for example, shows an embodiment with two induction coils 25 lying one above the other.

To be able to actuate the actuation element 27, then, an integrally formed engagement element 28 of the actuation element 27 points in the direction of the carrier substrate 6. The carrier substrate 6 hereby has, for example, an additional opening 30 and/or penetration opening, through which the control element 29 extends, in order to engage with the engagement element 28 and work together with it to effect actuation. The penetration opening 30 can hereby in particular form a guide for the control element 28.

Figure 4:
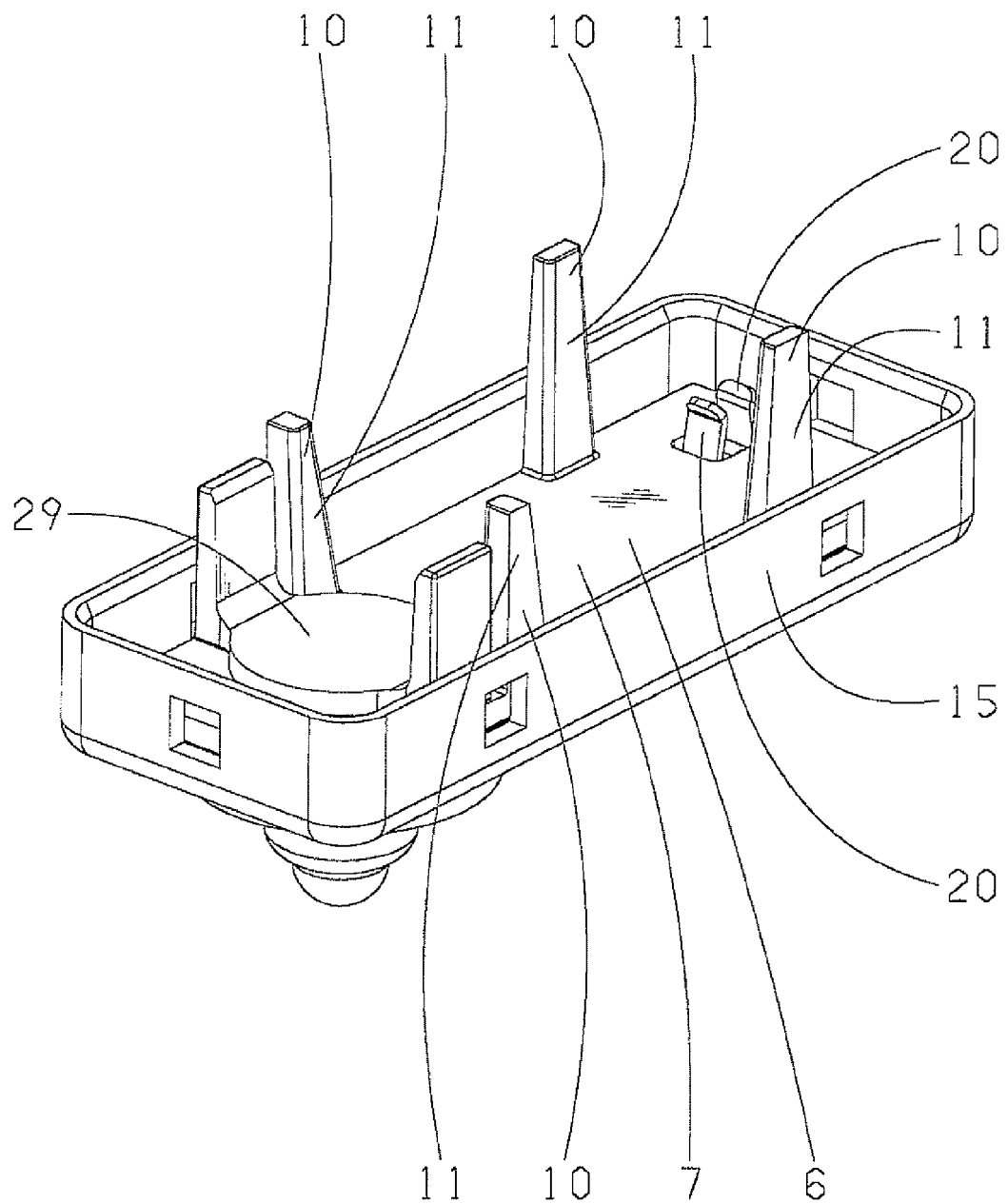
FIG. 4 shows an example of a pre-fastened antenna assembly in a housing upper part according to one embodiment of the invention.

The invention, for example, also provides that antenna assembly 7, which is formed of the carrier substrate 6 and antenna 5 that are separate from the circuit carrier 4, can be prefastened as shown in FIG. 4 in the housing upper part 15 before assembly of the radio switch 1, in such a way that the antenna 5 is connected to transmitter assembly 3 during fastening of the housing upper part 15 to the housing lower part 31 (FIG. 2). During this prefastening, for example, the pressing element 14 is brought into contact against antenna 5, for example by engagement of the carrier substrate 6 into the housing upper part 15.

REFERENCES

1 Radio switch
2 Generator
2a Vertically oriented outer side of generator
2b Horizontally oriented outer side of generator
3 Transmitter assembly
4 Circuit carrier
5 Antenna
6 Carrier substrate
7 Antenna assembly
8 Support surface
9 Housing
10 Carrier substrate support element
11 Leg
12 Holder
13 Groove
14 Support element
15 Housing upper part
16 Sealing element
17 Upper end of radio switch
18 Lower end of radio switch
19 Opening
20 Contact element
21 Upper end of circuit carrier
22 Upper end of generator
23 Lower end of generator
24 Magnetic element
25 Induction coil
26 Spring element
27 Actuation element
28 Engagement element
29 Control element
30 Additional opening
31 Housing lower part

The invention claimed is:

1. A radio snap-action switch comprising:
   an antenna;
   a transmitter assembly; and
   an energy generator;
   wherein the antenna is electrically connected to the transmitter assembly for the emission of a signal generated by the transmitter assembly;
   wherein the transmitter assembly is placed on a board-shaped circuit carrier; and
   wherein the antenna is held in the radio switch on a carrier substrate that is separate from the circuit carrier.

2. The radio switch according to claim 1
   wherein the antenna is held in position on the carrier substrate; and
   wherein the antenna and the carrier substrate do not form an independent connection between themselves.

3. The radio switch according to claim 1 wherein the carrier substrate is board-shaped and extends over a flat surface.

4. The radio switch according to claim 1 wherein the carrier substrate forms a holder for the antenna adapted to the contour of the antenna.

5. The radio switch according to claim 1
   wherein the antenna is permanently arranged between the carrier substrate and a support element; and
   wherein the support element acts as a pressing element.

6. The radio switch according to claim 5
   wherein the support element is supported against a housing element of the radio-switch; and
   wherein the housing element is at least one of a housing upper part or a housing lower part.

7. The radio switch according to claim 1
   wherein an opening is formed in the carrier substrate for the contacting of the antenna on the side of the carrier substrate away from the antenna; and
   wherein a contact element of the antenna extends through the opening.

8. The radio switch according to claim 1
   wherein the antenna has a contact element for a sliding contact connection or a plug connection; and
   wherein the contact element is formed for connection with corresponding contact surfaces on the circuit carrier.

9. The radio switch according to claim 1 wherein the circuit carrier extends in a vertical plane and the carrier substrate extends in a horizontal plane above the circuit carrier.

10. The radio switch according to claim 1
    wherein the antenna is contacted on the upper end of a circuit carrier extending in the vertical plane; and
    wherein the antenna is contacted by at least one of a form-fitting fastening process or a force-fitting fastening process.

11. The radio switch according to claim 1
    wherein the carrier substrate extends in a horizontal plane over an upper end of the energy generator, overlapping it in the vertical direction, in parallel with at least one of a horizontally oriented, adjacent outer side of the energy generator or of a housing inner side of the radio switch.

12. The radio switch according to claim 1 wherein the circuit carrier forms an L-shaped cross-section with the carrier substrate.

13. The radio switch according to claim 1 wherein the circuit carrier extends upward from a lower end of the radio switch of the energy generator, adjacent to at least one of an outer side of the energy generator or of a housing inner side of the radio switch, overlapping it in the lengthwise direction in a vertical plane parallel to it, up to the carrier substrate.

14. The radio switch according to claim 1
    wherein the energy generator has an actuation element that extends in the lengthwise direction adjacent to an induction coil together with it;
    wherein the actuation element overlaps the induction coil in the vertical direction; and
    wherein the carrier substrate overlaps the actuation element in the vertical direction.

15. The radio switch according to claim 1 wherein the energy generator is an induction snap energy generator.

16. The radio switch according to claim 1 wherein a control element extends through the carrier substrate to engage with an actuation element.

17. The radio switch according to claim 1 wherein the carrier substrate is sealed by a housing element of the radio switch.

\* \* \* \* \*